(12) United States Patent
Kim (10) Patent No.: US 8,325,824 B2
(45) Date of Patent: Dec. 4, 2012

(54) COMPUTER AND MONITOR, DISPLAY ENVIRONMENT ADJUSTMENT SYSTEM AND METHOD COMPRISING THE SAME

(75) Inventor: Young-ho Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1763 days.

(21) Appl. No.: 11/591,594

(22) Filed: Nov. 2, 2006

(65) Prior Publication Data

US 2007/0098355 A1 May 3, 2007

(30) Foreign Application Priority Data

Nov. 3, 2005 (KR) .................. 10-2005-0105117

(51) Int. Cl.
*H04N 7/18* (2006.01)
(52) U.S. Cl. .................. 375/240.28; 375/240.26
(58) Field of Classification Search . 375/240.01–240.29
See application file for complete search history.

(56) References Cited

U.S. PATENT DOCUMENTS

| | | | |
|---|---|---|---|
| 5,987,624 A | 11/1999 | Eglit | |
| 6,392,642 B1 | 5/2002 | Wu | |
| 6,670,964 B1 | 12/2003 | Ward et al. | |
| 6,816,171 B2 | 11/2004 | Kim | |
| 7,079,128 B2 * | 7/2006 | Kim | 345/213 |
| 2005/0046747 A1 | 3/2005 | Park et al. | |

FOREIGN PATENT DOCUMENTS

| | | |
|---|---|---|
| CN | 1368673 A | 9/2002 |
| EP | 1 394 765 A2 | 3/2004 |
| JP | 2001-092418 | 4/2001 |
| JP | 2001-100701 | 4/2001 |
| KR | 10-1998-0041562 | 8/1998 |
| KR | 10-2002-0027114 A | 4/2002 |
| KR | 10-2005-0023579 A | 3/2005 |
| KR | 10-2005-0052767 A | 6/2005 |

OTHER PUBLICATIONS

Yongmao Feng et al., "Digital Visual Interface—DVI 1.0", Sep. 30, 2003, pp. 54-57, China Academic Journal Electronic Publishing House, China.

* cited by examiner

*Primary Examiner* — Andy Rao
(74) *Attorney, Agent, or Firm* — Roylance, Abrams, Berdo and Goodman, LLP (57) ABSTRACT

A display environment adjustment system and method are provided for a computer which comprises a connector with which a monitor is connected, and a video card supplying a video signal to the monitor through the connector, further comprising a program storage part which stores an auto adjustment program therein to control the video card supplying a pattern video signal according to a predetermined adjustment mode adjusting a display environment depending on the type of the monitor, and a controller which checks the type of the monitor when the monitor is connected with the connector, determines optimal adjustment environment information of the monitor by executing the auto adjustment program and supplies the pattern video signal according to the adjustment mode to the monitor based on the optimal adjustment environment information. Thus, the system and method provide a computer and monitor which display an optimal image by executing a display environment auto adjustment function through a video card connected with a monitor when the monitor is initially connected with the computer.

28 Claims, 6 Drawing Sheets

COMPUTER AND MONITOR, DISPLAY ENVIRONMENT ADJUSTMENT SYSTEM AND METHOD COMPRISING THE SAME

CROSS-REFERENCE TO RELATED APPLICATIONS

This application claims the benefit under 35 U.S.C. 119 of Korean Patent Application No. 10-2005-0105117, filed in the Korean Intellectual Property Office on Nov. 3, 2005, the entire disclosure of which is incorporated herein by reference.

BACKGROUND OF THE INVENTION

1. Field of the Invention

The present invention relates to a computer and monitor. More particularly, the present invention relates to a computer and a monitor which performs a display environment auto adjustment function, and a display environment adjustment system and method comprising the same.

2. Description of the Related Art

Generally, a monitor comprises an electrically erasable programmable read only memory (EEPROM) which stores enhanced display information data (EDID) such as a monitor model name, a supportable resolution and a resolution recommended by a manufacture that are needed to install a monitor driver to a computer when connecting the monitor to the computer. When the monitor is installed/connected to the computer, a computer operating system communicates with the monitor through a display data channel (DDC) by a plug and play (PnP) function, and installs a driver available for the monitor by reading the EDID from the EEPROM provided in the monitor.

The monitor further comprises a signal processor, which processes an input video signal to display an image on a display part according to the video signal input from a signal source such as a video card provided in the computer. The signal processor which is provided in an LCD monitor which receives an analog video signal from the video card and accordingly displays the image, converts the analog video signal into a digital video signal such as through sampling the input video signal. The LCD monitor typically has problems resulting from converting the analog video signal into the digital video signal. For example, the problems may range from an inadequate vertical/horizontal display position, color changes, fine noise of the displayed image, to out-of-focus images.

Thus, the LCD monitor preferably performs an auto adjustment function which adjusts a display setting value of the signal processor according to the type of the video card providing the analog video signal, to display an optimal image without the foregoing problems due to the conversion of the analog video signal into the digital video signal. Here, the display setting value comprises a preset value of the signal processor. The signal processor converts the analog video signal into the digital video signal based on the display setting value.

To perform the auto adjustment function for adjusting the display setting value of the signal processor in the LCD monitor, the LCD monitor needs to receive a pattern video signal according to a certain adjustment mode for the auto adjustment instead of a video signal for displaying a general image, thereby executing the auto adjustment function based on the supplied pattern video signal according to the certain adjustment mode.

As described above, a manufacturer provides the auto adjustment function to the LCD monitor while manufacturing the LCD monitor, in general. A user does not typically know about the information (ex. resolution, vertical/horizontal frequency) on the certain adjustment mode for executing the auto adjustment function of the LCD monitor or information on an adequate pattern video signal. The video card supplying the analog video signal to the monitor provides a video signal having a different back porch and front porch according to a manufacturer and a specification.

After connecting the LCD monitor with the computer, the auto adjustment function is executed through the video card included in the computer, and then the LCD monitor processes and displays the video signal supplied by the computer according to the display setting value preset during the manufacturing stage, even though the LCD monitor can display the optimal image by processing the video signal according to the display setting value adjusted by the auto adjustment function.

Accordingly, the conventional LCD monitor processes the video signal according to the display setting value preset during the manufacturing stage, instead of considering the video card of the computer to be used, thereby causing problems in converting the analog video signal into the digital video signal.

Accordingly, a need exists for a system and method for displaying an optimal image using adjustment information.

SUMMARY OF THE INVENTION

Accordingly, it is an aspect of exemplary embodiments of the present invention to address the above and other problems, and provide a computer and a monitor which display an optimal image by executing a display environment auto adjustment function through a video card connected with a monitor when the monitor is initially connected with the computer, and a display environment adjustment system and method comprising the same.

Additional aspects and/or advantages of exemplary embodiments of the present invention will be set forth in part in the description which follows and, in part, will be obvious from the description, or may be learned by practice of exemplary embodiments of the present invention.

The foregoing and/or other aspects of exemplary embodiments of the present invention are also achieved by providing a computer which comprises a connector with which a monitor is connected, and a video card supplying a video signal to the monitor through the connector, the computer further comprising a program storage part which stores an auto adjustment program therein to control the video card supplying a pattern video signal according to a predetermined adjustment mode adjusting a display environment depending on the type of the monitor, and a controller which checks the type of the monitor when the monitor is connected with the connector, determines optimal adjustment environment information of the monitor by executing the auto adjustment program and supplies the pattern video signal according to the adjustment mode to the monitor based on the optimal adjustment environment information.

According to another aspect of exemplary embodiments of the present invention, the controller checks the type of the monitor based on EDID supplied by the monitor at an initial installing stage when the monitor is connected with the connector.

According to another aspect of exemplary embodiments of the present invention, the controller executes the auto adjustment program to determine the optimal adjustment environment information of the connected monitor and to supply the pattern video signal according to the adjustment mode, to the monitor based on the optimal adjustment environment information when it is determined that the connected monitor is new based on the checking result.

According to another aspect of exemplary embodiments of the present invention, the auto adjustment program checks the type of signal processor which is provided in the monitor and processes the video signal supplied by the video card to be displayable, and determines the optimal adjustment environment information corresponding to the type of the checked signal processor based on the EDID supplied by the monitor.

According to another aspect of exemplary embodiments of the present invention, the optimal adjustment environment information comprises at least one of resolution information, vertical frequency information and horizontal frequency information of the pattern video signal to be supplied to the monitor corresponding to the type of the signal processor.

According to another aspect of exemplary embodiments of the present invention, the display environment of the monitor is adjusted by a display setting value which the signal processor uses to process the video signal.

The foregoing and/or other aspects of exemplary embodiments of the present invention are also achieved by providing a monitor which comprises a display part and a signal input part receiving a video signal from the outside, the monitor further comprising a signal processor which processes the video signal supplied through the signal input part according to a preset display setting value and outputs the video signal to the display part, an EDID storage part which stores EDID therein, and a microcomputer which controls the signal processor to calculate an optimal display setting value based on the pattern video signal and to change the preset display setting value to the calculated display setting value when the pattern video signal according to a predetermined adjustment mode is input from a computer which has read the EDID from the EDID storage part through the signal input part.

According to another aspect of exemplary embodiments of the present invention, the signal processor comprises a UI generator which generates a UI menu signal to display a predetermined UI menu on the display part, and wherein the microcomputer controls the signal processor to display an auto adjustment selection UI menu on the display part to select a display environment auto adjustment function changing the preset display setting value of the signal processor based on the pattern video signal when the pattern video signal according to the adjustment mode is input through the signal input part.

According to another aspect of exemplary embodiments of the present invention, the monitor further comprises a user input part which is provided to input a command by a user, and wherein the microcomputer controls the signal processor to calculate the optimal display setting value based on the pattern video signal and to change the preset display setting value to the calculated display setting value when the display environment auto adjustment function is selected through the user input part from the auto adjustment selection UI menu.

According to another aspect of exemplary embodiments of the present invention, the signal processor displays a pattern image according to the pattern video signal on the display part, calculates an optimal vertical/horizontal display setting value to display the pattern image on an optimal vertical/horizontal display position on the display part and an optimal sampling frequency setting value/sampling timing setting value to display the pattern image on the display part with an optimal picture quality, and changes the preset display setting value to the calculated vertical/horizontal display setting value and the calculated sampling frequency setting value and the calculated sampling timing setting value, by the control of the microcomputer.

The foregoing and/or other aspects of exemplary embodiments of the present invention are also achieved by providing a display environment adjustment system of a monitor which displays a video signal supplied from a computer on a display part, the system comprising a signal processor which is provided in the monitor and processes the video signal according to a preset display setting value to output the video signal to the display part, a microcomputer which is provided in the monitor and controls the signal processor to calculate an optimal display setting value based on a pattern video signal when the pattern video signal is input according to a predetermined adjustment mode from the computer, and to change the preset display setting value to the calculated display setting value, a video card which is provided in the computer and supplies the video signal, a program storage part which is provided in the computer and stores an auto adjustment program to control the video card supplying the pattern video signal according to the predetermined adjustment mode adjusting a display environment depending on the type of the monitor, and a controller which is provided in the computer and which checks the type of the monitor connected with the computer and executes the auto adjustment program to determine optimal adjustment environment information of the monitor and to supply the pattern video signal according to the adjustment mode, to the monitor based on the optimal adjustment environment information.

According to another aspect of exemplary embodiments of the present invention, the monitor comprises an EDID storage part which stores EDID therein, and wherein the controller checks the type of the monitor based on the EDID supplied by the EDID storage part of the monitor, when the monitor is initially connected with the computer.

According to another aspect of exemplary embodiments of the present invention, the controller executes the auto adjustment program to determine the optimal adjustment environment information of the connected monitor and to supply the pattern video signal according to the adjustment mode, to the monitor based on the optimal adjustment environment information when it is determined that the connected monitor is new based on the checking result.

According to another aspect of exemplary embodiments of the present invention, the auto adjustment program checks the type of the signal processor which is provided in the monitor, and determines the optimal adjustment environment information corresponding to the type of the checked signal processor based on the EDID supplied by the monitor.

According to another aspect of exemplary embodiments of the present invention, the optimal adjustment environment information comprises at least one of resolution information, vertical frequency information and horizontal frequency information of the pattern video signal to be supplied to the monitor corresponding to the type of the signal processor.

According to another aspect of exemplary embodiments of the present invention, the display environment of the monitor is adjusted by a display setting value which is used to process the video signal by the signal processor.

According to another aspect of exemplary embodiments of the present invention, the signal processor comprises a UI generator which generates a UI menu signal to display a predetermined UI menu on the display part, and wherein the microcomputer controls the signal processor to display an auto adjustment selection UI menu on the display part to select a display environment auto adjustment function changing the preset display setting value of the signal processor based on the pattern video signal when the pattern video signal according to the adjustment mode is input from the computer.

According to another aspect of exemplary embodiments of the present invention, the system further comprises a user input part which is provided to input a command by a user, and wherein the microcomputer controls the signal processor to calculate an optimal display setting value based on the pattern video signal and to change the preset display setting value to the calculated display setting value when the display environment auto adjustment function is selected through the user input part from the auto adjustment selection UI menu.

According to another aspect of exemplary embodiments of the present invention, the signal processor displays a pattern image according to the pattern video signal on the display part, calculates an optimal vertical/horizontal display setting value to display the pattern image on an optimal vertical/horizontal display position on the display part and an optimal sampling frequency setting value/sampling timing setting value to display the pattern image on the display part with an optimal picture quality, and changes the preset display setting value to the calculated vertical/horizontal display setting value and the calculated sampling frequency setting value and the calculated sampling timing setting value, by the control of the microcomputer.

The foregoing and/or other aspects of exemplary embodiments of the present invention are also achieved by providing a display environment auto adjustment method of a monitor which displays a video signal supplied from a video card provided in a computer, the method comprising storing an auto adjustment program in the computer to control the video card supplying a pattern video signal according to a predetermined adjustment mode adjusting a display environment depending on the type of the monitor, determining whether the monitor connected with the computer exists, checking the type of the monitor by the computer when the monitor connected with the computer exists, executing the stored auto adjustment program by the computer, and determining optimal adjustment environment information corresponding to the type of the monitor through the auto adjustment program, and supplying the pattern video signal according to the adjustment mode, to the monitor based on the optimal adjustment environment information determined through the auto adjustment program.

According to another aspect of exemplary embodiments of the present invention, checking the type of the monitor comprises checking the type of the monitor based on EDID supplied by the monitor when the monitor is initially connected with the computer.

According to another aspect of exemplary embodiments of the present invention, determining the optimal adjustment environment information corresponding to the type of the monitor comprises determining whether the connected monitor is new based on the checking result, and executing the auto adjustment program to determine the optimal adjustment environment information of the connected monitor and to supply the pattern video signal according to the adjustment mode, to the monitor based on the optimal adjustment environment information when it is determined that the connected monitor is new.

According to another aspect of exemplary embodiments of the present invention, the auto adjustment program checks the type of signal processor which is provided in the monitor and processes the video signal supplied by the video card to be displayable, and determines the optimal adjustment environment information corresponding to the type of the checked signal processor based on the EDID supplied by the monitor.

According to another aspect of exemplary embodiments of the present invention, the optimal adjustment environment information comprises at least one of resolution information, vertical frequency information and horizontal frequency information of the pattern video signal to be supplied to the monitor corresponding to the type of the signal processor.

According to another aspect of exemplary embodiments of the present invention, the method further comprises calculating an optimal display setting value based on the pattern video signal when the pattern video signal according to the adjustment mode is input from the computer, and changing a preset display setting value of the signal processor to the calculated display setting value.

According to another aspect of exemplary embodiments of the present invention, calculating the optimal display setting value comprises displaying an auto adjustment selection UI menu to select whether to execute a display environment auto adjustment function changing the preset display setting value of the signal processor based on the pattern video signal when the pattern video signal according to the adjustment mode is input from the computer, and calculating the optimal display setting value based on the pattern video signal when the display environment auto adjustment function is selected from the displayed auto adjustment selection UI menu.

BRIEF DESCRIPTION OF THE DRAWINGS

The above and/or other aspects and advantages of exemplary embodiments of the present invention will become apparent and more readily appreciated from the following description of the embodiments, taken in conjunction with the accompanying drawings, of which.

Throughout the drawings, like reference numerals will be understood to refer to like parts, components and structures.

DETAILED DESCRIPTION OF EXEMPLARY EMBODIMENTS

Reference will now be made in detail to the embodiments of the present invention, examples of which are illustrated in the accompanying drawings, wherein like reference numerals refer to like elements throughout.

Figure 1:
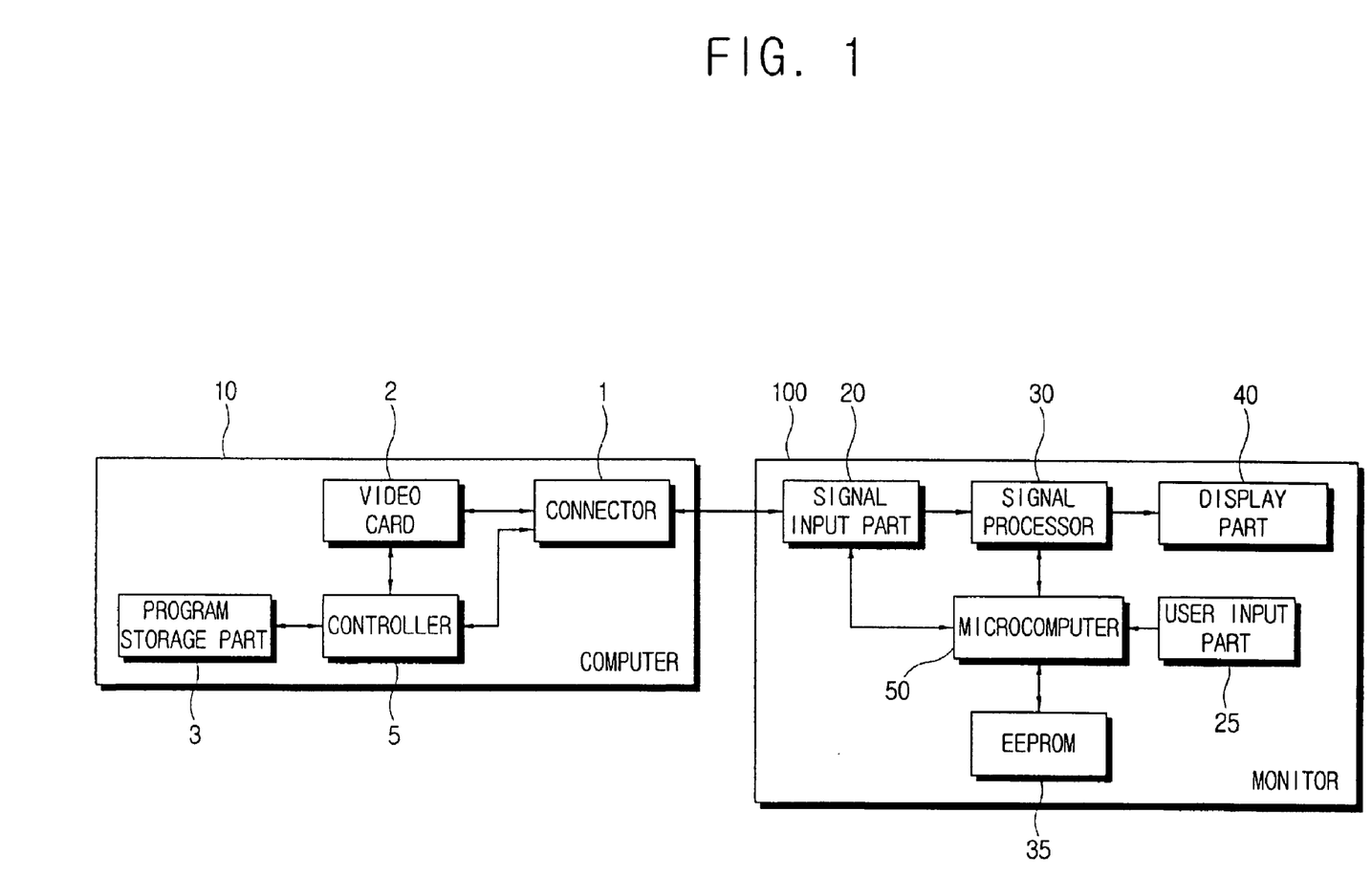
FIG. 1 is a control block diagram of a display environment adjustment system according to an exemplary embodiment of the present invention.

FIG. 1 is a control block diagram of a display environment adjustment system according to an exemplary embodiment of the present invention. As shown therein, the display environment adjustment system according to an exemplary embodiment of the present invention comprises a computer 10 which supplies a video signal, and a monitor 100 which displays an image according to the video signal supplied by the computer 10.

The computer 10 according to an exemplary embodiment of the present invention comprises a connector 1 which is connected with the monitor 100, a video card 2 which outputs a video signal to be supplied to the monitor 100, a program storage part 3 which stores an auto adjustment program therein to control the video card 2 supplying a pattern video signal according to a predetermined adjustment mode adjusting a display environment according to the kind of the monitor 100, and a controller 5 which checks the kind of the monitor 100 when the monitor 100 is connected with the connector 1, and determines optimal adjustment environment information of the monitor 100 by executing the auto adjustment program and controls the computer 10 to supply the pattern video signal according to the adjustment mode to the monitor 100, based on the optimal adjustment environment information. The monitor 100 according to an exemplary embodiment of the present invention comprises a signal input part 20, a user input part 25, a signal processor 30, an EEPROM 35, a display part 40, and a microcomputer 50.

The video card 2 generates/outputs the video signal through the control of the controller 5 (as described in greater detail below), to be supplied to the monitor 100. The video card 2 outputs an analog video signal. The video card 2 may generate/output the pattern video signal according to a certain adjustment mode through the control of the controller 5.

Here, the pattern video signal output from the video card 2 according to the certain adjustment mode is supplied to the monitor 100 and is used to execute the display environment auto adjustment function adjusting a display setting value of a signal processor 30 (as described in greater detail below).

Preferably, the certain adjustment mode comprises a video mode which has a certain resolution and vertical/horizontal frequency to supply the pattern video signal to effectively execute the display environment auto adjustment function by the monitor 100. The pattern video signal preferably comprises a video signal which displays a predetermined pattern image so that a user recognizes that the auto adjustment function is being executed, when the monitor 100 displays the pattern video signal and executes the display environment auto adjustment function. That is, the certain adjustment mode and the pattern video signal according thereto may be equal/similar to those supplied to a conventional monitor to execute the display environment auto adjustment function of the monitor during a manufacturing stage.

The program storage part 3 stores the auto adjustment program therein which controls the video card 2 to supply the pattern video signal according to the predetermined adjustment mode adjusting the display environment depending on the kind of the monitor 100. Here, the auto adjustment program stored in the program storage part 3 comprises a software program that is offered by a predetermined route such as being included in an installing diskette when installing the monitor 100 to the computer 10, and which is stored in the program storage part 3.

When the controller 5 determines that the monitor 100 is installed with the computer 10, the auto adjustment program stored in the program storage part 3 checks the type of the signal processor 30 (as described in greater detail below) provided in the monitor 100, based on EDID (as described in greater detail below) of the monitor 100. The auto adjustment program determines the optimal adjustment environment information corresponding to the kind of the signal processor 30 based on a determination result. Then, the auto adjustment program controls the video card 2 to supply the pattern video signal according to the certain adjustment mode, to the monitor 100 based on the optimal adjustment environment information.

Here, the optimal adjustment environment information corresponding to the type of the signal processor 30 comprises resolution information and vertical/horizontal frequency information which are adequate for executing the display environment auto adjustment function adjusting the display setting value of the signal processor 30 according to the type of the signal processor 30 based on the EDID.

For example, when the auto adjustment program is embodied as a computer program language (such as visual C++ program language), the auto adjustment program may read the EDID from the EEPROM 35 of the monitor 100 by using a PnP function supported by an operating system. Also, the auto adjustment program may control the resolution and vertical/horizontal frequency of the video card 2 by using a ChangeDisplayEx function to output the pattern video signal according to the certain adjustment mode based on the optimal adjustment environment information.

The controller 5 reads the EDID from the monitor 100 at the installing stage when the monitor 100 is connected with the connector 1. The controller 5 may read the EDID from the EEPROM 35 provided in the monitor 100 by DDC communicating with the monitor 100 through the PnP function. The controller 5 checks the type of the monitor 100 and determines whether the connected monitor 100 is a new monitor. When it is determined that the connected monitor 100 is a new monitor 100, the controller 5 executes the auto adjustment program of the program storage part 3.

As described above, the auto adjustment program determines the optimal adjustment environment information of the monitor 100 and controls the video card 2 to supply the pattern video signal according to the certain adjustment mode, to the monitor 100 based on the optimal adjustment environment information.

When a completion signal is received from the monitor 100 informing that the display environment auto adjustment function is completed after executing the auto adjustment program and supplying the pattern video signal according to the certain adjustment mode to the monitor 100, the controller 5 disables the auto adjustment program and controls the video card 2 to output a predetermined video signal according to a user's request.

Thus, the computer 10 according to exemplary embodiments of the present invention supplies the pattern video signal of the certain adjustment mode to execute the display environment auto adjustment function by the monitor 100 based on the EDID of the monitor 100 when the monitor 100 is installed with the computer 10, and allows the monitor 100 to execute the display environment auto adjustment function at the initial, installing stage to display an optimal image according to the video signal supplied by the computer 10.

The monitor 100 according to exemplary embodiments of the present invention comprises an LCD monitor which receives the analog video signal and processes the input video signal to display an image according to the video signal.

The monitor 100 comprises the display part 40, the signal input part 20 which receives a video signal supplied from the outside, the signal processor 30 which processes the video signal supplied through the signal input part 20 according to a preset display setting value and outputs the video signal to the display part 40, the EEPROM 35 which stores the EDID therein, the user input part 25 which is provided to input a command by a user, and the microcomputer 50 which controls the signal processor 30 to calculate the optimal display setting value based on the pattern video signal and to change the preset display setting value to the calculated display setting value when the pattern video signal according to the predetermined adjustment mode is input from the computer 10.

The user input part 25 performs a predetermined function according to a user's input. The user input part 25 may comprise a key input part which generates a key signal according to a user's manipulation and outputs it to the microcomputer 50. The user input part 25 comprises an auto adjustment key to execute the display environment auto adjustment function. The user input part 25 may be provided on a front surface of the monitor 100, or as an input unit that is additionally connected with the monitor 100, that is, a mouse (not shown), a keyboard (not shown), or as a remote control.

The EEPROM 35 stores enhanced display information data (EDID) as monitor information such as a model name of the monitor 100, a product number of the signal processor 50 and resolution supported by the signal processor 50, and resolution, color coordinates, vertical/horizontal frequency and color bits recommended by a manufacturer.

The signal processor 30 processes the video signal supplied through the signal input part 20 according to the preset display setting value and outputs the video signal to the display part 40. The signal processor 30 converts the analog video signal supplied through the signal input part 20 into the digital video signal according to the preset display setting value, and scales the digital video signal into a format to be displayable on the display part 40. The signal processor 30 may comprise a UI generator (not shown) which generates a UI menu signal to display a predetermined auto adjustment selection UI menu on the display part 40.

The signal processor 30 processes the pattern video signal according to the certain adjustment mode supplied by the computer 10 to display it on the display part 40, calculates the optimal display setting value based on the pattern video signal and changes/sets the preset display setting value to the calculated display setting value, through the control of the microcomputer 50. That is, the signal processor 30 processes the pattern image according to the pattern video signal and displays it on the display part 40, and calculates the optimal vertical/horizontal display setting values to display the pattern image on an optimal vertical display position and a horizontal display position of the display part 40. The signal processor 30 calculates an optimal sampling frequency setting value and an optimal sampling timing setting value to display the pattern image on the display part 40 with an optimal picture quality. Thus, the signal processor 30 changes the preset display setting value to the calculated vertical/horizontal display setting values and the calculated sampling frequency setting value and the calculated sampling timing setting value, and processes the video signal according to the changed display setting value.

The microcomputer 50 controls the signal processor 30 to display the auto adjustment selection UI menu on the display part 40 selecting whether to execute the display environment auto adjustment function when the pattern video signal according to the certain adjustment mode is input through the signal input part 25. The microcomputer 50 determines whether the auto adjustment key is input to execute the display environment auto adjustment function through the user input part 25, while displaying the auto adjustment selection UI menu on the display part 40. When receiving the request to perform the display environment auto adjustment function, the microcomputer 50 controls the signal processor 30 to calculate the optimal display setting value based on the pattern video signal according to the certain adjustment mode supplied by the computer 10 and to change the preset display setting value to the calculated display setting value.

Figure 4:
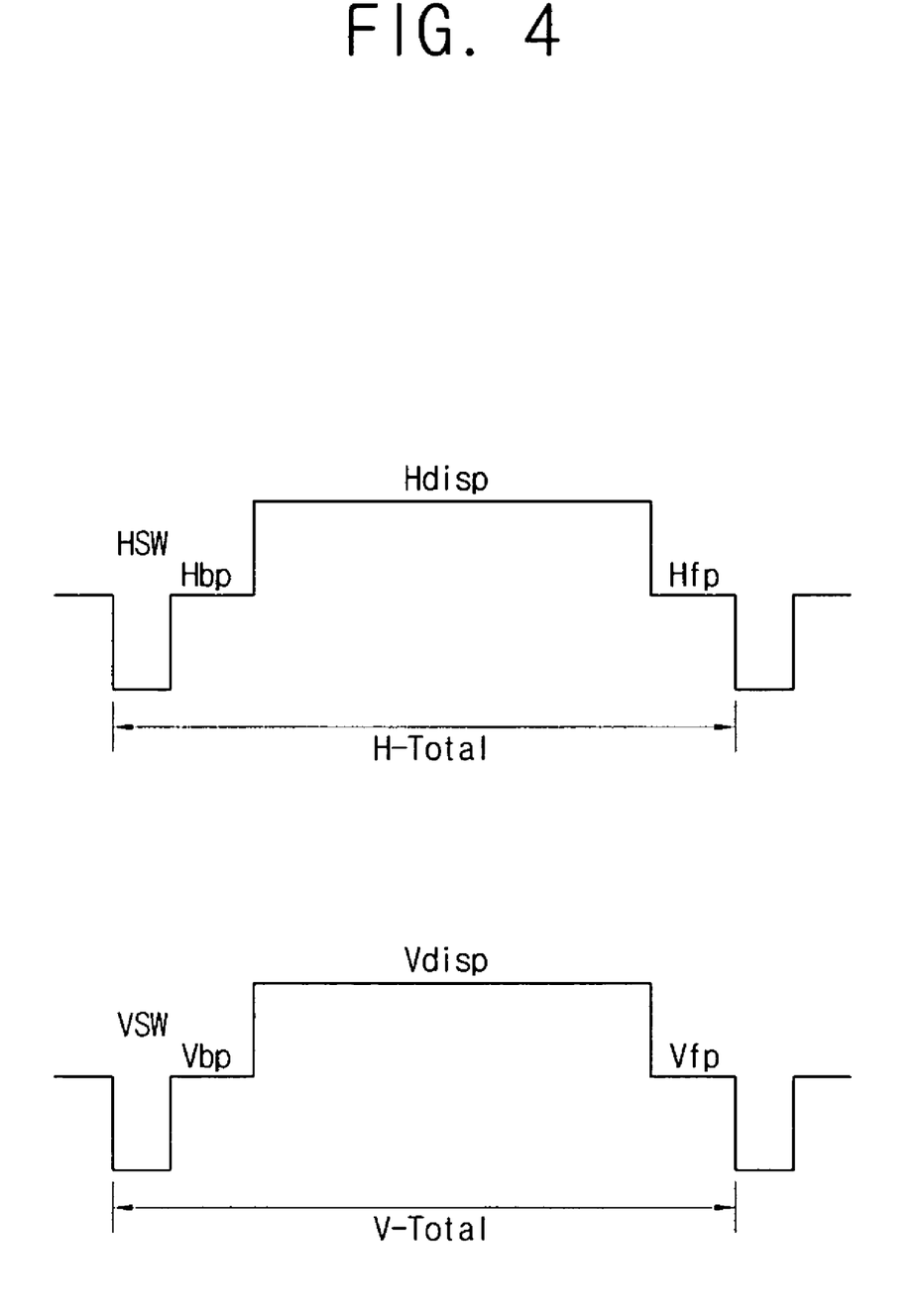
FIG. 4 illustrates an example of a pattern video signal which is input to the monitor according to an exemplary embodiment of the present invention.
Figure 5:
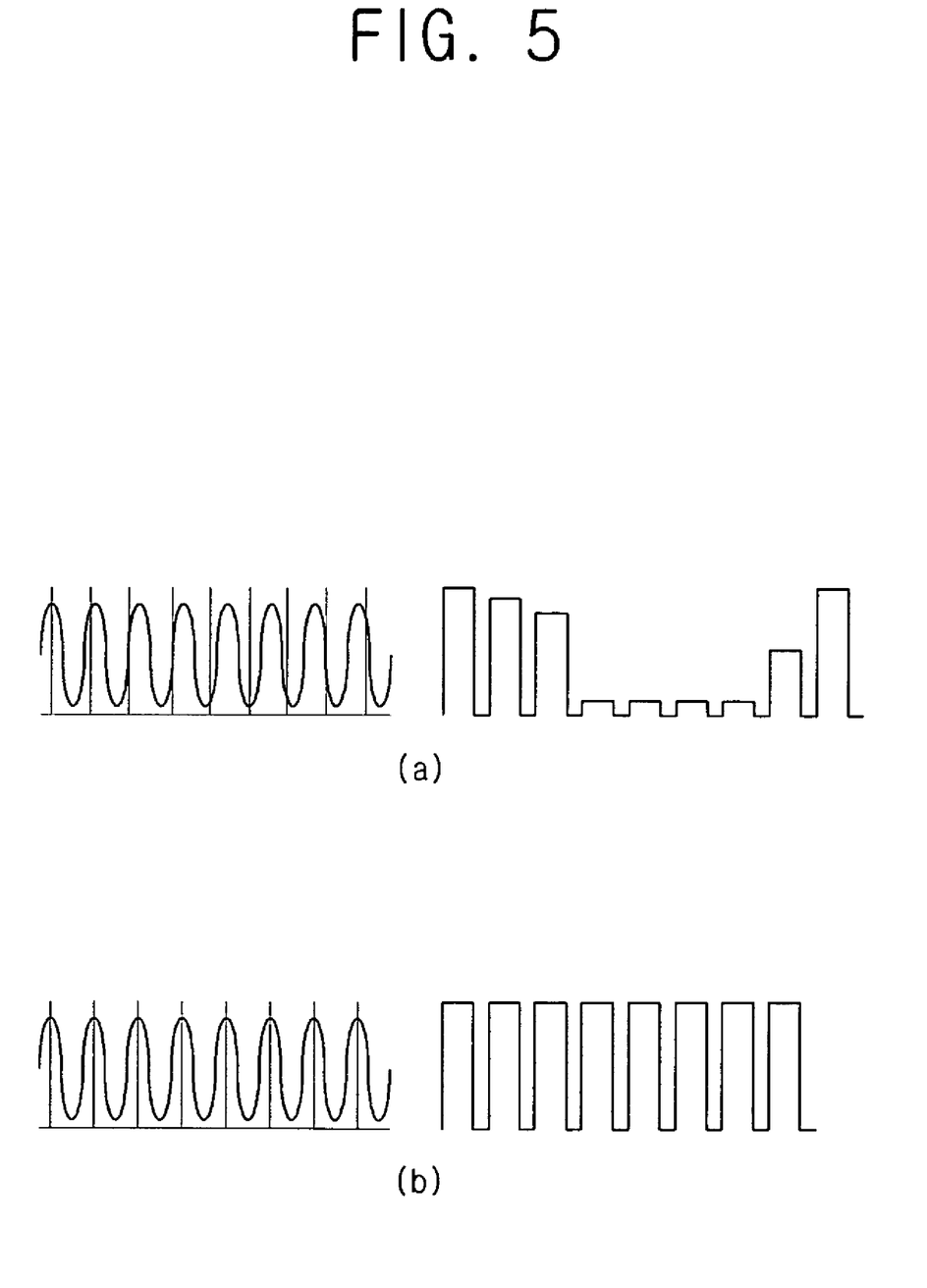
FIG. 5 illustrates an example of a coarse adjustment of the monitor according to an exemplary embodiment of the present invention.
Figure 6:
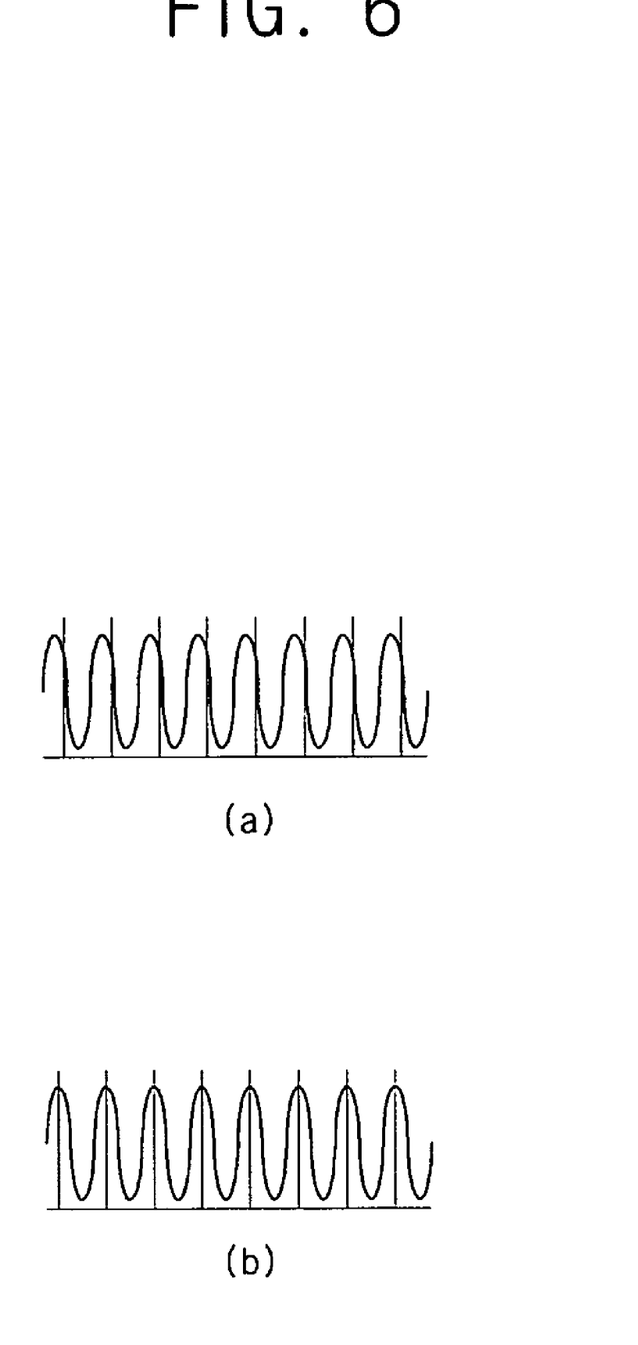
FIG. 6 illustrates an example of a fine adjustment of the monitor according to an exemplary embodiment of the present invention.

Referring to FIGS. 4 through 6, a process of executing the display environment auto adjustment function by calculating the optimal display setting value based on the pattern video signal in the monitor 100 and by changing the preset display setting value to the calculated display setting value will be described according to an exemplary embodiment of the present invention.

As shown in FIG. 4, an H-Total signal included in a horizontal part of the pattern video signal supplied by the computer 10 comprises an H-Start Width (HSW), an H-back porch (Hbp), an H-front porch (Hfp) and an H-display (Hdisp). A V-Total signal included in a vertical part of the pattern video signal supplied by the computer 10 comprises a V-Start Width (VSW), a V-back porch (Vbp), a V-front porch (Vfp) and a V-display (Vdisp).

Here, the HSW and the VSW comprise a beginning of the horizontal part and the vertical part of each frame. The Hdisp and the Vdisp comprise horizontal/vertical parts of an image viewed by a user in each frame. The remaining Hbp, Hfp, Vbp and Vfp are input before/after Hdisp and Vdisp, which are not viewed in reality.

The signal processor 30 checks the positions of the Hbp, Hfp, Vbp and Vfp from the horizontal and vertical parts of the pattern video signal according to the control of the microcomputer 50 which has determined that the display environment auto adjustment function is requested to be executed. The signal processor 30 may check the beginning and end of the horizontal/vertical parts of each frame. Based on data of the beginning and end of the horizontal/vertical parts in each frame, the signal processor 30 calculates the optimal vertical/horizontal display setting values to display the image on the optimal vertical display position and the horizontal display position, and changes the preset display setting value to the calculated vertical/horizontal display setting values. Accordingly, the horizontal/vertical display positions of the image displayed on the display part 40 is automatically adjusted, thereby displaying the image on the optimal display position.

When the frequency of the pattern video signal is not equal to the sampling frequency, the pattern video signal may be irregularly sampled as shown in (a) in FIG. 5, thereby generating a fine noise from the image or a vertical block bar when sampling the pattern video signal supplied by the computer 10 with a certain frequency to convert the pattern video signal into the digital video signal.

Then, the signal processor 30 searches a frequency to uniformly sample the pattern video signal as shown in (b) in FIG. 5, while converting the sampling frequency in various ways according to the control of the microcomputer 50 which has determined that the display environment auto adjustment function is requested to be executed.

As shown in (b) in FIG. 5, the signal processor 30 calculates the optimal sampling frequency setting value based on the frequency found while converting the sampling frequency in various ways to uniformly sample the pattern video signal, and changes the preset display setting value to the calculated sampling frequency setting value. Then, a coarse adjustment function is automatically executed for the displayed image to display the image with the optimal picture quality.

When sampling the pattern video signal supplied by the computer 10 with the predetermined frequency to convert it into the digital video signal, the image may become unclear as the phase is not properly adjusted, even though the frequency of the pattern video signal is equal to the sampling frequency as shown in (a) in FIG. 6.

The signal processor 30 then changes the sampling timing according to the control of the microcomputer 50 which has determined that the display environment auto adjustment function is requested to be executed, and searches a point of time where the pattern video signal has the highest voltage value, to sample the pattern video signal at a proper time, as shown in (b) in FIG. 6.

The signal processor 30 calculates the optimal sampling timing setting value based on the searched point of time while changing the sampling timing in various ways, and changes the preset display setting value to the calculated sampling timing setting value. A fine adjustment function is then automatically executed for the displayed image, thereby displaying the image in focus and having the optimal picture quality.

Preferably, when the signal processor 30 completes the display environment auto adjustment through the foregoing process, the microcomputer 50 outputs the completion signal to the computer 10 informing that the display environment auto adjustment function is completed.

When the display environment auto adjustment is not requested through the user input part 25, the microcomputer 50 controls the signal processor 30 to maintain the preset display setting value, instead of executing the display environment auto adjustment function based on the pattern video signal according to the certain adjustment mode supplied by the computer 10.

When the monitor 100 is initially installed with the computer 10, the monitor 100 according to exemplary embodiments of the present invention automatically executes the display environment auto adjustment function based on the pattern video signal according to the certain adjustment mode supplied by the computer 10. The monitor 100 according to exemplary embodiments of the present invention displays the auto adjustment selection UI menu and allows a user to select the execution of the display environment auto adjustment function, thereby enabling the display environment auto adjustment of the monitor 100 when the monitor 100 is initially installed with the computer 10.

Figure 2:
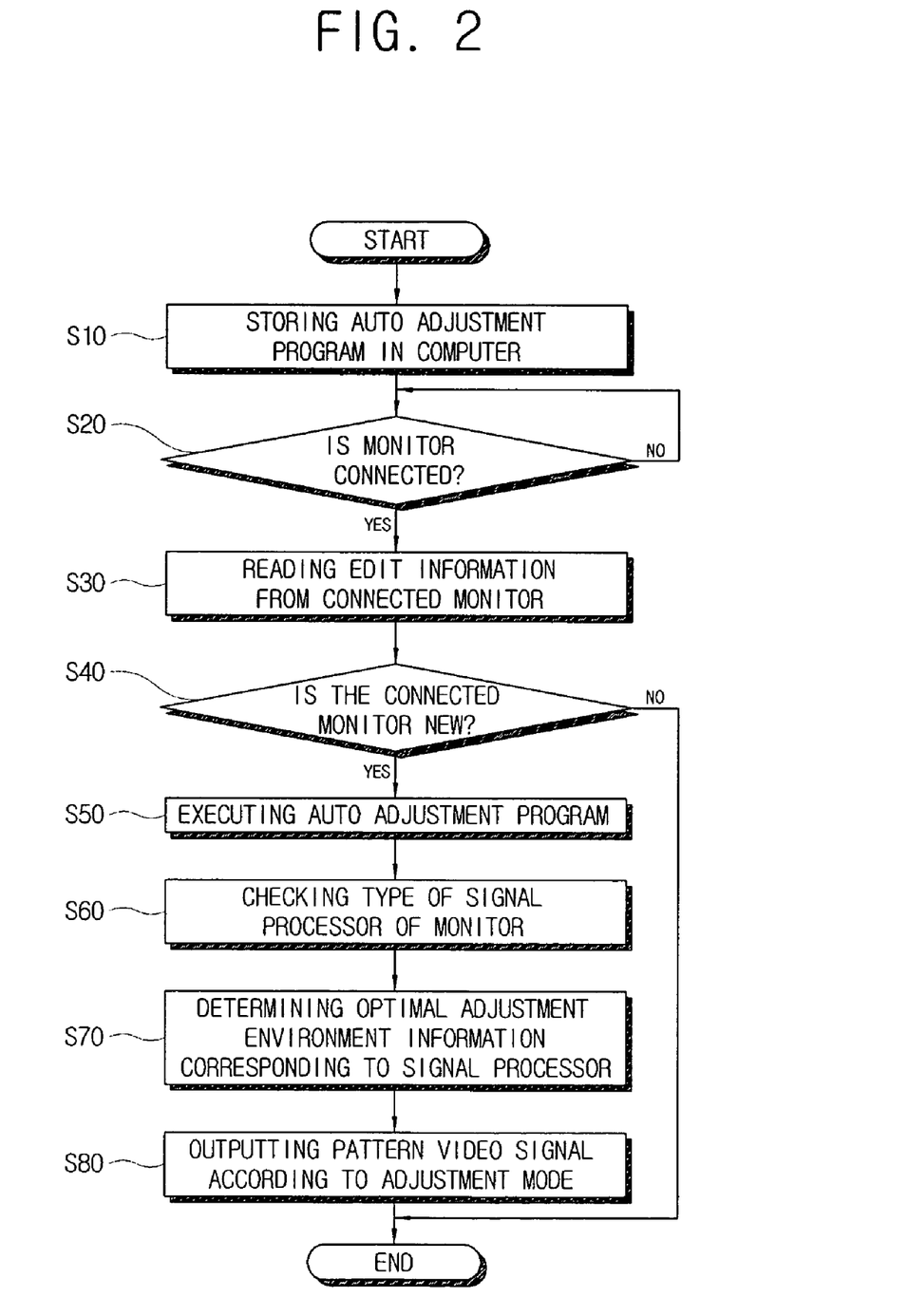
FIG. 2 is a control flowchart of a computer according to an exemplary embodiment of the present invention.
Figure 3:
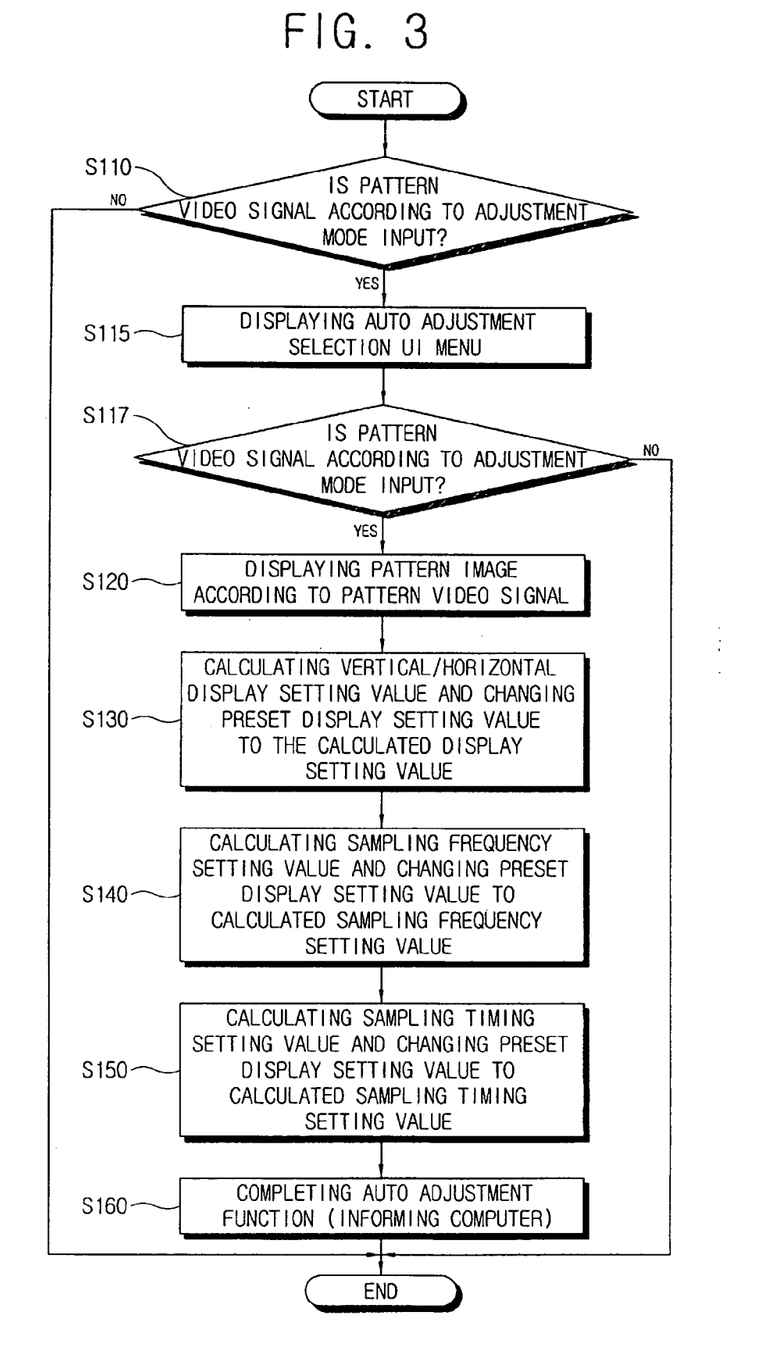
FIG. 3 is a control flowchart of a monitor according to an exemplary embodiment of the present invention.

Referring to FIGS. 2 and 3 which respectively illustrate control flows of the computer 10 and the monitor 100, the auto adjustment method of the display environment auto adjustment system comprising the computer 10 and the monitor 100 according to exemplary embodiments of the present invention will now be described in greater detail.

The computer 10 stores the auto adjustment program in the program storage part 3 to control the video card 2 supplying the pattern video signal according to the predetermined adjustment mode adjusting the display environment depending on the type of the monitor 100 at step (S10). Here, the controller 5 of the computer 10 determines whether the monitor 100 is connected with the connector 1 at step (S20). When the monitor 100 is connected therewith, the controller 5 reads the EDID from the monitor 100 while DDC communicating with the monitor 100 at step (S30). The controller 5 determines whether the connected monitor 100 is new based on the read EDID at step (S40). When it is determined that the connected monitor 100 is new, the controller 5 executes the auto adjustment program of the program storage part 3 at step (S50).

Then, the executed auto adjustment program checks the type of the signal processor 30 provided in the monitor 100 based on the EDID of the monitor 100 at step (S60). The auto adjustment program determines the optimal adjustment environment information corresponding to the type of the signal processor 30 determined by a checking result at step (S70). The auto adjustment program controls the video card 2 to supply the pattern video signal according to the certain adjustment mode, to the monitor 100 based on the optimal adjustment environment information at step (S80).

Even though it is not shown in FIG. 2, the controller 5 disables the auto adjustment program when the completion signal is received from the monitor 100 informing that the display environment auto adjustment is completed, and controls the video card 2 to output the predetermined video signal according to a user's request, after the operation of step (S80).

As shown in FIG. 3, the microcomputer 50 of the monitor 100 determines whether the pattern video signal according to the certain adjustment mode supplied by the computer 10 through the signal processor 25 is input at step (S110). When the pattern video signal according to the certain adjustment mode is input, the microcomputer 50 controls the signal processor 30 to display the auto adjustment selection UI menu to select the display environment auto adjustment function, on the display part 40 at step (S115). While displaying the auto adjustment selection UI menu on the display part 40, the microcomputer 50 determines whether the auto adjustment key is input through the user input part 50 to request the display environment auto adjustment at step (S117). When the display environment auto adjustment is requested, the microcomputer 50 controls the signal processor 30 to display the pattern image according to the pattern video signal on the display part 40 at step (S120), and controls the signal processor 30 to calculate the optimal display setting value based on the pattern video signal according to the certain adjustment mode supplied by the computer 10 and to change the preset display setting value to the calculated display setting value at steps (S130, S140 and S150).

Hereinafter, the operations of steps (S130, S140 and S150) controlling the signal processor 30 by the microcomputer 50, calculating the optimal display setting value based on the pattern video signal and changing the preset display setting value to the calculated display setting value, will be described in greater detail.

The signal processor 30 checks the positions of Hbp, Hfp, Vbp and Vfp in the horizontal/vertical parts of the pattern video signal according to the control of the microcomputer 50, and calculates the optimal vertical/horizontal display setting values to display the image on the optimal vertical/horizontal display positions based on the data of the beginning and end of the horizontal/vertical parts in each frame. The signal processor 30 then changes the preset display setting value to the calculated vertical/horizontal display setting values at step (S130).

The signal processor 30 calculates the optimal sampling frequency setting value based on the frequency found while converting the sampling frequency in various ways to uniformly sample the pattern video signal according to the control of the microcomputer 50, and executes the auto adjustment (coarse adjustment) function changing the preset display setting value to the calculated sampling frequency setting value at step (S140).

The signal processor 30 calculates the optimal sampling timing setting value based on the point of time where the pattern video signal has the highest voltage value, while converting the sampling timing in various ways to sample the pattern video signal at a proper time, and executes the auto adjustment (fine adjustment) function changing the preset display setting value to the sampling timing setting value at step (S150).

The operations of steps (S130) through (S150) are sequentially performed in the control flowchart in FIG. 3, but not limited thereto. Alternatively, the sequence of the operations of steps (S130) through (S150) may be variously arranged.

The microcomputer 50 outputs the completion signal to the computer 10 informing that the display environment auto adjustment is completed at step (S160), when the display environment auto adjustment of steps (S130, S140 and S150) changing the preset display setting value to the calculated display setting value based on the pattern video signal according to the certain adjustment mode supplied by the computer 10 is completed.

As described above, in the display environment adjustment system and the display environment adjustment method according to exemplary embodiments of the present invention, the computer 10 supplies the pattern video signal of the certain adjustment mode to the monitor 100 to execute the display environment auto adjustment function when the monitor 100 is initially installed with the computer 10, thereby enabling the monitor 100 to execute the display environment auto adjustment to display the optimal image according to the video signal supplied by the computer 10.

The auto adjustment selection UI menu is displayed on the monitor 100 to execute the display environment auto adjustment function, thereby enabling the monitor 100 to execute the display environment auto adjustment when the monitor 100 is initially installed with the computer 10, in the display environment adjustment system and the adjustment method according to exemplary embodiments of the present invention.

As the display environment auto adjustment function is executed through the video card included in the computer connected with the monitor, the display setting value is automatically adjusted to display the video signal of the computer as the optimal image. Thus, the optimal image may be displayed according to the automatically-adjusted display setting value adequate for the video card of the computer to be used by a user, instead of according to the display setting value set by a manufacturer during the manufacturing process of the monitor.

As described above, exemplary embodiments of the present invention provide a computer and a monitor which display an optimal image by executing an auto adjustment function through a video card connected with the monitor when the monitor is initially installed to the computer, and a display environment adjustment system comprising the same and a control method thereof.

Although a number of exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A computer, comprising:
   a signal source for supplying a pattern video signal to a monitor;
   a program storage part in which an auto adjustment program may be stored, the audio adjustment program controlling the signal source to supply the pattern video signal according to a predetermined adjustment mode for adjusting a display environment of the monitor based on the type of monitor; and
   a controller for determining adjustment environment information of the monitor by executing the auto adjustment program and for controlling the signal source to supply the pattern video signal to the monitor based on the adjustment environment information.

2. The computer according to claim 1, wherein the controller is configured to check the type of monitor when the monitor is connected to the computer, based on enhanced display information data (EDID) stored in the monitor.

3. The computer according to claim 2, wherein the controller is configured to:
   determine whether the connected monitor is a newly connected monitor; and
   execute the auto adjustment program when it is determined that the connected monitor is a newly connected monitor, to determine the adjustment environment information of the connected monitor and to control the signal source to supply the pattern video signal to the monitor based on the adjustment environment information of the connected monitor.

4. The computer according to claim 2, wherein the auto adjustment program comprises instructions for:
   checking the type of monitor; and
   determining, based on the EDID, the adjustment environment information corresponding to the checked type of monitor.

5. The computer according to claim 2, wherein the adjustment environment information corresponds to the checked type of monitor and comprises at least one of resolution information of the pattern video signal, vertical frequency information of the pattern video signal, and horizontal frequency information of the pattern video signal.

6. A monitor, comprising:
   a data storage part in which enhanced display information data (EDID) is stored;
   a signal processor for receiving a pattern video signal from a computer according to a predetermined adjustment mode, after the computer reads the stored EDID, and for processing the received pattern video signal according to a preset display setting value; and
   a microcomputer for controlling the signal processor to calculate a display setting value based on the received pattern video signal and to change the preset display setting value to the calculated display setting value.

7. The monitor according to claim 6, wherein
   the microcomputer is configured to control the signal processor to generate a signal for displaying a predetermined user-interface (UI) menu for selecting a display environment auto adjustment function for changing the preset display setting value of the signal processor based on the received pattern video signal.

8. The monitor according to claim 7, wherein
   the display setting value is calculated and the preset display setting value is changed when the display environment auto adjustment function is selected.

9. The monitor according to claim 6, wherein the signal processor is configured to:
   generate a pattern image according to the received pattern video signal;
   calculate a vertical/horizontal display setting value for displaying the pattern image on a vertical/horizontal display position and a sampling frequency setting value/sampling timing setting value for displaying the pattern image with a picture quality; and
   change the preset display setting value to the calculated vertical/horizontal display setting value, the calculated sampling frequency setting value, and the calculated sampling timing setting value.

10. A display environment adjustment system, comprising:
   a signal processor for receiving a pattern video signal from a computer according to a predetermined adjustment mode and for processing the received pattern video signal according to a preset display setting value;
   a microcomputer for controlling the signal processor to calculate a display setting value based on the received pattern video signal and to change the preset display setting value to the calculated display setting value;

a signal source for supplying the pattern video signal to the monitor;

a program storage part in which an auto adjustment program may be stored, the auto adjustment program controlling the signal source to supply the pattern video signal according to the predetermined adjustment mode for adjusting a display environment of the monitor based on the type of signal processor; and a controller for determining adjustment environment information of the monitor by executing the auto adjustment program and for controlling the signal source to supply the pattern video signal to the monitor based on the adjustment environment information.

11. The system according to claim 10, wherein the controller is configured to check the type of signal processor when the monitor is connected to the computer, based on enhanced display information data (EDID) stored in the monitor.

12. The system according to claim 11, wherein the controller is configured to:

determine whether the connected monitor is a newly connected monitor; and execute the auto adjustment program when it is determined that the connected monitor is a newly connected monitor, to determine the adjustment environment information of the connected monitor and to control the signal source to supply the pattern video signal to the monitor based on the adjustment environment information of the connected monitor.

13. The system according to claim 11, wherein the auto adjustment program comprises instructions for:

checking the type of signal processor; and determining, based on the EDID, the adjustment environment information corresponding to the checked type of signal processor.

14. A display environment auto adjustment method, comprising:

storing an auto adjustment program in a computer, the auto adjustment program controlling a signal source to supply a pattern video signal to a monitor according to a predetermined adjustment mode for adjusting a display environment of the monitor based on the type of monitor;

determining adjustment environment information of the monitor by executing the stored auto adjustment program; and supplying the pattern video signal of the controlled signal source to the monitor based on the adjustment environment information.

15. The method according to claim 14, further comprising:

determining whether the monitor is connected to the computer; and checking the type of monitor when it is determined that the monitor is connected to the computer, based on enhanced display information data (EDID) stored in the monitor.

16. The method according to claim 15, wherein the adjustment environment information of the monitor is determined by:

determining whether the connected monitor is a newly connected monitor; and executing the auto adjustment program when it is determined that the connected monitor is a newly connected monitor, to determine the adjustment environment information of the connected monitor and to supply the pattern video signal to the monitor based on the adjustment environment information of the connected monitor.

17. The method according to claim 15, wherein the auto adjustment program comprises instructions for:

checking the type of monitor; and determining, based on the EDID, the adjustment environment information corresponding to the checked type of monitor.

18. The method according to claim 15, wherein the adjustment environment information corresponds to the checked type of monitor and comprises at least one of resolution information of the pattern video signal, vertical frequency information of the pattern video signal, and horizontal frequency information of the pattern video signal.

19. The method according to claim 14, the method further comprising:

calculating a display setting value of the monitor based on the supplied pattern video signal; and changing a preset display setting value of the monitor to the calculated display setting value.

20. The method according to claim 14, the method further comprising:

displaying a predetermined user-interface (UI) menu for selecting a display environment auto adjustment function for changing the preset display setting value of the monitor based on the supplied pattern video signal; and calculating the display setting value based on the supplied pattern video signal when the display environment auto adjustment function is selected.

21. A computer-readable recording medium on which instructions for controlling a display environment auto adjustment function of a monitor are stored, the instructions comprising:

a first set of instructions for controlling a program storage part in which an auto adjustment program may be stored, the auto adjustment program controlling a signal source to supply a pattern video signal according to a predetermined adjustment mode for adjusting a display environment depending on the type of monitor; and a second set of instructions for controlling a controller to determine adjustment environment information of the monitor by executing the auto adjustment program and to control the signal source to supply the pattern video signal to the monitor based on the adjustment environment information.

22. The computer-readable recording medium according to claim 21, the second set of instructions comprising instructions to check the type of monitor when the monitor is connected to the computer, based on enhanced display information data (EDID) stored in the monitor.

23. The computer-readable recording medium according to claim 22, the second set of instructions further comprising instructions to:

determine whether the connected monitor is a newly connected monitor;

execute the auto adjustment program to determine the adjustment environment information of the connected monitor, when it is determined that the connected monitor is a newly connected monitor; and control the signal source to supply the pattern video signal to the monitor based on the adjustment environment information of the connected monitor.

24. The computer-readable recording medium according to claim 22, the second set of instructions further comprising instructions for:

checking the type of monitor; and determining, based on the EDID, the adjustment environment information corresponding to the checked type of monitor.

25. The computer according to claim 2, wherein the executed auto adjustment program determines adjustment environment information corresponding to the checked type of monitor.

26. The monitor according to claim 6, wherein the predetermined adjustment mode is set using a display environment auto adjustment function for changing the preset display setting value of the signal processor based on the received pattern video signal, to adjust a display environment of the monitor based on the type of monitor.

27. The monitor according to claim 26, wherein the display environment of the monitor is adjusted according to the display setting value used to process the received pattern video signal.

28. The method according to claim 14, further comprising:
generating a pattern image according to the supplied pattern video signal;
calculating a vertical/horizontal display setting value for displaying the pattern image on a vertical/horizontal display position of the monitor and a sampling frequency setting value/sampling timing setting value for displaying the pattern image with a picture quality; and
changing a preset display setting value of the monitor to the calculated vertical/horizontal display setting value, the calculated sampling frequency setting value, and the calculated sampling timing setting value.

* * * * *